United States Patent [19]
Rosenquist

[11] Patent Number: 5,410,997
[45] Date of Patent: * May 2, 1995

[54] HIGH PERFORMANCE AUTOMOTIVE ENGINE GASKET AND METHOD OF SEALING A HIGH PERFORMANCE ENGINE

[75] Inventor: Gerald A. Rosenquist, Lake Zurich, Ill.

[73] Assignee: Fel-Pro Incorporated, Skokie, Ill.

[*] Notice: The portion of the term of this patent subsequent to Jan. 4, 2011 has been disclaimed.

[21] Appl. No.: 176,962

[22] Filed: Jan. 3, 1994

Related U.S. Application Data

[63] Continuation-in-part of Ser. No. 15,648, Feb. 9, 1993, Pat. No. 5,275,139.

[51] Int. Cl.⁶ .............................................. F16J 15/12
[52] U.S. Cl. ............................... 123/193.3; 277/235 B
[58] Field of Search ............... 123/193.3, 193.2, 193.5; 277/235 B, 227, 235 R, 180, 236

[56] References Cited

U.S. PATENT DOCUMENTS

| | | | |
|---|---|---|---|
| 4,369,980 | 1/1983 | Backlin | 277/235 B |
| 4,662,643 | 5/1987 | Rosenquist | 277/235 B |
| 4,776,601 | 10/1988 | Yamada | 277/235 B |
| 4,791,897 | 12/1988 | Udagawa | 123/193.3 |
| 4,809,653 | 3/1989 | Udagawa et al. | 123/193.3 |
| 5,078,413 | 1/1992 | Miyaoh | 277/235 B |
| 5,215,314 | 6/1993 | Nakaya | 277/235 B |
| 5,275,139 | 1/1994 | Rosenquist | 277/235 B |

Primary Examiner—Andrew M. Dolinar
Assistant Examiner—M. Macy
Attorney, Agent, or Firm—Laff, Whitesel, Conte & Saret, Ltd.

[57] ABSTRACT

A method of sealing a high performance internal combustion engine with a head gasket having a fire ring comprising providing a groove in the head or block generally concentric with each said combustion opening, each groove having a land area and a generally vertical wall, and positioning the gasket on the block so that when the head is torqued down, each groove receives a fire ring and compresses the wire ring thereof to provide a primary seal therewith at the land area, the wall engages the armor of the fire ring to form a secondary seal, and the head and block clamping surfaces engages the armor to clamp the armor. The head gasket has a main body of a first thickness and defines a plurality of combustion openings. A fire ring is disposed and secured in each combustion opening, each fire ring comprising an armor ensheathing a wire ring for providing a combustion seal. The armor is of a second thickness substantially greater than the first thickness. The armor and main body may be integrally formed. In use, the combustion seal provides a labyrinth seal against the spaced surfaces of the groove and against a corner defined by the groove.

9 Claims, 3 Drawing Sheets

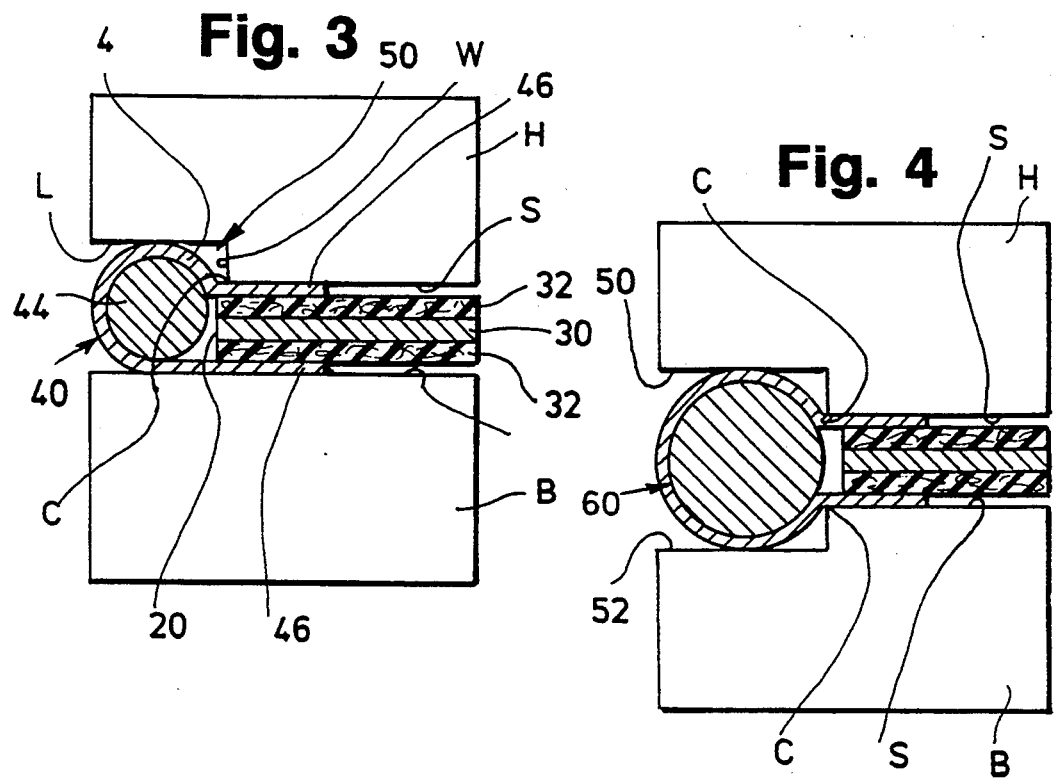
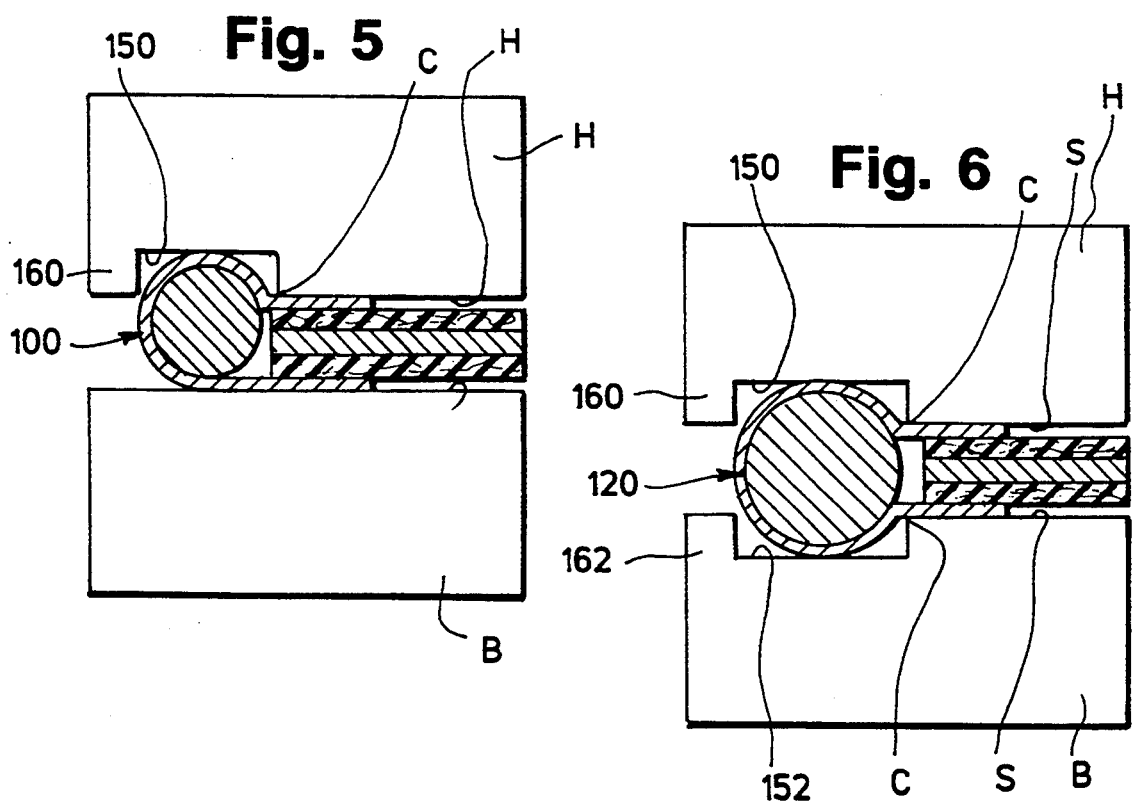

HIGH PERFORMANCE AUTOMOTIVE ENGINE GASKET AND METHOD OF SEALING A HIGH PERFORMANCE ENGINE

RELATED APPLICATIONS

This application is a continuation-in-part of U.S. application Ser. No. 08/015,648, filed on Feb. 9, 1993 now U.S. Pat. No. 5,275,139.

BACKGROUND OF THE INVENTION

The invention of this application relates to gasketing for high performance racing engines. High output, high performance automobile engines, such as those used for racing, present the gasket and sealing engineer with severe operating conditions which are exceedingly difficult to contend with. Standard passenger car laminated gaskets, used in a conventional manner, do not stand up to such service conditions and result in blow-out and leakage when cylinder pressures overcome the clamping force of the head bolts or studs. When that happens, the head tends to lift away from the block, unloading the gasket, and providing a leakage path for liquids and gases. Further, if the lifting force is great enough, the combustion seal may be lifted out of position or may otherwise be forced out of position, resulting in engine failure.

A variety of mechanisms have been employed to seek to overcome such problems.

For example, high output racing engine builders for years have used a solid copper gasket and stainless steel wire rings placed in adjacent grooves in the cylinder head and in the block around the cylinders. This is very durable from a combustion seal standpoint, but the sealing of coolants is very difficult and requires multiple, separate auxiliary seals for that purpose.

Other engine builders have used an additional wire ring around the cylinder in the block that contacts the gasket body, adjacent to an associated armor having a wire ring. This design is undesirable because the clamping force intended for effecting the combustion seal is then divided between two wires instead of the one in the gasket as designed by the manufacturer.

Still other engine builders have used conventional passenger car gaskets and either installed a wire ring that contacts the gasket on a horizontal or upper surface of the armor, or adjacent to the armor. The problem with this is that when such a wire is positioned on the armor and is loaded, the armor tends to split due to high stress levels. When such a wire is positioned adjacent to the armor, it divides the clamping forces, or causes loading on the gasket body itself to be insufficient to seal effectively in the main body of the gasket, such as around the coolant and oil holes, or both. Further, loose wire rings are subject to pull-in and blow out in use, each of which can result in engine failure.

It is therefore an object of the present invention to provide an improved sealing mechanism for high performance engines and which includes an integrated gasket having an armor and wire which may be installed as a single unit, and without the need for utilizing separate or auxiliary sealing elements. The sealing assembly of the present invention provides effective sealing and resists both blow-out and pull-in of the wire ring in operation of the sealed engine assembly.

SUMMARY OF THE INVENTION

In accordance with the present invention, a method for sealing a high performance internal combustion engine with integrated sealing elements is provided. The engine has a head and a block, each having a main clamping surface. An associated integrated head gasket is positioned between the main clamping surfaces. The method includes the steps of providing a gasket having a plurality of combustion openings and comprising a main body and a fire ring for each combustion opening, each fire ring comprising a wire ring and an armor ensheathing the wire ring, the wire ring being oversized and having a thickness greater than the thickness of the main body; providing a groove in one or both of the head and the block generally concentric with each combustion opening, each groove having a land area and a generally vertical wall which intersects with the main clamping surface of the head or block; and positioning the gasket on the block relative to the head, so that when the head is torqued down, each groove receives a fire ring to compress the wire ring to provide a primary seal therewith at the land area, and the head and block main clamping surfaces engage the armor to clamp the armor against the main body. The main body and armor may be integrally formed.

In one form of the method the legs fully embrace the facing layers to provide a tertiary seal therewith against the head and the block to seal against passage of combustion gases therepast and to prevent pull-in of the armor into an associated cylinder. Desirably, at least one of the head and block main clamping surfaces define an annular corner at the edge of the groove which, under load, bears against the adjacent armor and acts with a resultant force which intersects the wire ring to provide a highly effective secondary seal for the engine. Vertically aligned groove portions may be provided in each of the head and block, each of which receives the fire ring when the head is torqued down.

The automotive engine and head gasket assembly of the present invention comprises a head, a block defining cylinders and a head gasket. The head and block together define a pair of confronting clamping surfaces and a perimetric groove surrounding each cylinder and disposed between the pair of surfaces, the groove having a pair of confronting spaced surfaces having a first vertical dimension between them. The head gasket defines a plurality of combustion openings and comprises a main body of a first thickness and a fire ring disposed and secured in each combustion opening, and ensheathing a wire ring for providing a combustion seal. The armor has a second vertical dimension greater than the first vertical dimension prior to assembly and which is substantially greater than the thickness of the gasket main body, whereby, in use, the combustion seal provides a labyrinth seal against the spaced surfaces of the groove and against a corner defined by the groove. The body and armor may be integral.

In one form, the groove is defined in part by each of the head and block. The groove may define an entryway from the cylinder thereto, the entryway being substantially less in vertical dimension than the first vertical dimension, thereby to prevent movement of the combustion seal therethrough. The entryway may be defined in part by a locking lip formed with at least one of the head and block.

Further objects, features and advantages of the present invention will become apparent from the following description and appended drawings.

BRIEF DESCRIPTION OF THE DRAWINGS

FIG. 3 is a cross-sectional view taken substantially along line 3—3 of FIG. 2;

FIGS. 4–6 are cross-sectional views like that of FIG. 3, but showing other embodiments previously disclosed;

DETAILED DESCRIPTION OF THE PREFERRED EMBODIMENTS

Figure 1:
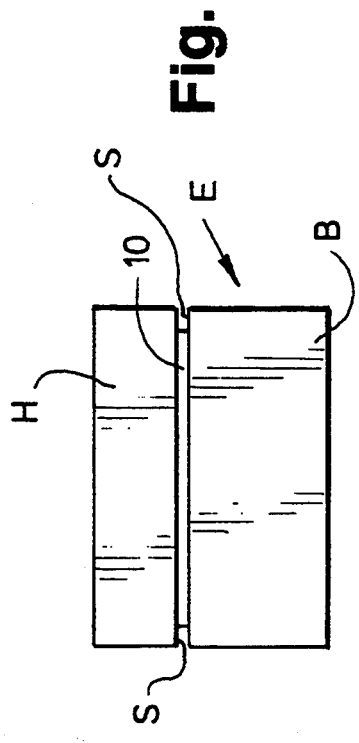
FIG. 1 is a schematic view of an automotive engine assembly in accordance with the invention disclosed in my prior application Ser. No. 08/015,648.

Referring now to the drawings, an engine assembly in accordance with my invention as disclosed in application Ser. No. 08/015,648, comprises an engine E (shown schematically in FIG. 1) having a head H and a block B. A gasket 10 in accordance with this invention is disposed between them in a sealing relationship against their respective clamping surfaces S.

The head and block define a plurality of combustion cylinders as well as oil and coolant passages and bolt holes via which the engine assembly is clamped. The gasket 10 defines aligned, complementary combustion openings 20, coolant and oil passages 22, and bolt holes 24.

The gasket 10 comprises a main body 12 which includes a central metal core 30, such as of cold rolled steel, and facing layers 32 laminated to the surface of metal core 30. Facing layers may be of typical fiber-/elastomer materials, such as glass fibers or other fibrous materials and may utilize nitrile, neoprene, or polyacrylic elastomers as binders. Fillers and other conventional ingredients may also be present.

At each combustion opening 20, a fire ring 40 is provided. Fire ring 40 includes an armor 42 and a wire ring 44. Wire 44 may be of low carbon steel. Armor 42 may be stainless steel and is generally of a U-shaped cross-section having a closed end, which receives and ensheathes the wire ring 44, and a pair of legs 46 which overlie and grip the main gasket body at the peripheries of the combustion openings 20. The legs 46 may preferably fully embrace the peripheries of the main body or may comprise tabs, as illustrated by U.S. Pat. No. 3,560,007, for suspending the wire ring 44 in the opening.

Although the gasket 10 so far described employs well-known features and components, it is different from most such gaskets by its use of an oversized wire ring 44 having a thickness or diameter which is greater than the thickness of the main body 12 for a purpose to be described.

The sealing system of the present invention also contemplates the provision and use of a groove 50 in one or both of the head and block of the engine. Thus, a perimetric groove surrounding each cylinder may be machined into the clamping surface S of the head adjacent and generally concentric with the combustion opening 20 in the main body 12 of the gasket. The groove may be variously configured, but it defines a recess in the head having a surface which may be referred to as a generally horizontal land area L and a generally vertical wall W extending between land area L and the confronting clamping surface S. The wall and clamping surface S intersect in a corner C which may be generally square or which may be slightly chamfered. The height of the groove is such that when the engine is closed and the gasket is properly positioned, the wire ring 44 will be significantly compressed.

Figure 2:
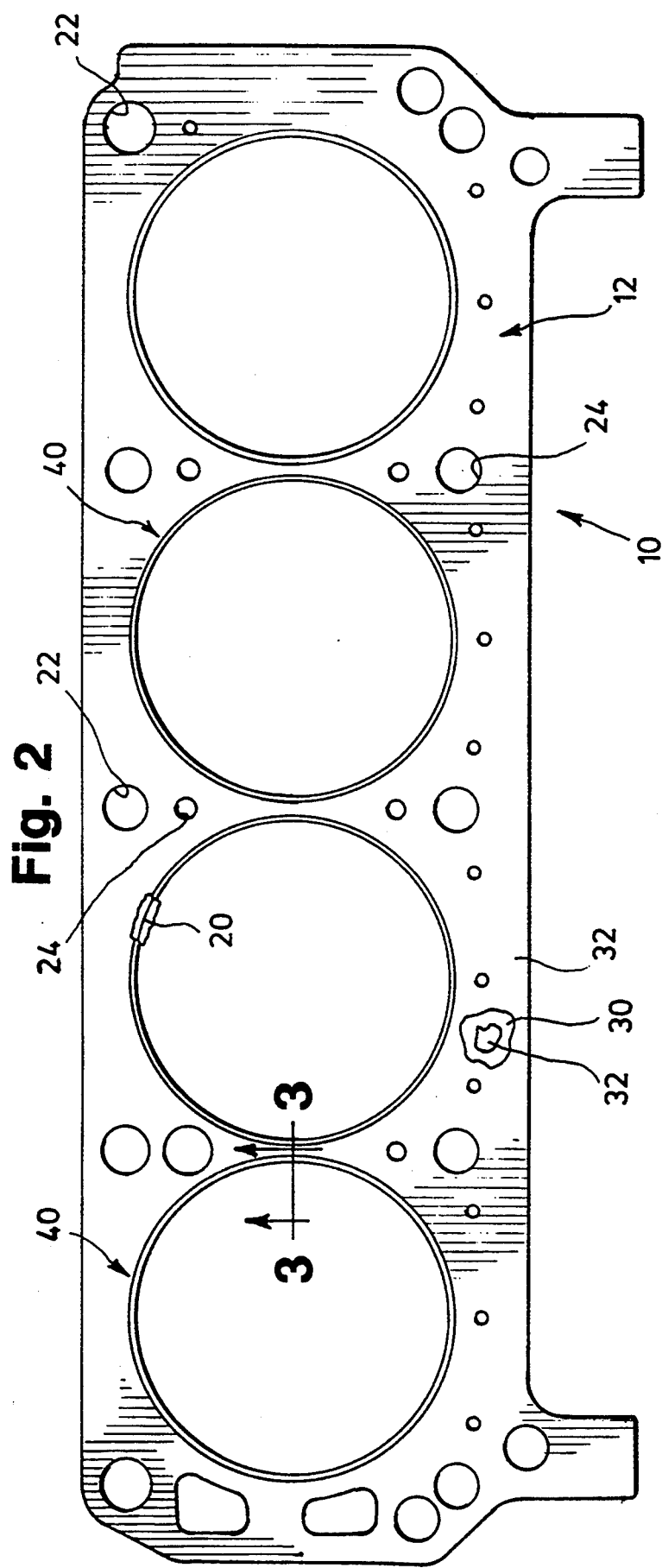
FIG. 2 is a plan view of a gasket employed in the engine assembly of FIG. 1.

From FIGS. 2 and 3 it will be apparent that when the gasket is positioned on the block relative to the head, and the gasket 10 is torqued down between clamping surfaces S of the head and block via bolts (not shown), that the gasket is securely clamped into sealing engagement with the head and block and the wire ring is compressed. Indeed the gasket and armor produce a combustion seal which has a primary seal against the land area L, a secondary seal against the corner C and a tertiary seal against the head and block in the zone of the legs 46 of the armor at which the armor is clamped against the main body. The plural seals also produce a labyrinth effect, with any escaping gas being under reduced pressure at the secondary and tertiary seals, making sealing of those zones somewhat easier. Of course, the liquid seals are provided by the composite facing layers 32.

The gasket and engine assemblies described provide combustion seals which are more effective than those currently used and which are more convenient than those typically used in high performance engines. The assemblies resist pull-in, the tendency of wire to be pulled into the combustion cylinders under high vacuum under extreme conditions. Similarly, physical blow-out of the armors and associated wire rings is avoided by the groove 50 and corner C, and by-pass of gases in extreme operating conditions is avoided via the multiple (primary, secondary and tertiary) gas seals.

Enhanced sealing and interlocking can be achieved by additionally grooving the clamping surface of the block as illustrated by FIG. 4. In that embodiment, a block groove 52 complementary to the head groove 50 is provided. These groove portions which define a pair of confronting spaced surfaces cooperate with a fire ring 60 having an armor and wire ring as just described in the same manner to provide primary and secondary seals at each of the two locations, rather than at one location, thereby enhancing the sealing potential of the assembly.

The grooves 50, 52 illustrated thus far may extend inwardly to the engine cylinders. It is also possible to recess the grooves so that they lock the armor and wire ring, not only against blow out, but against pull-in as well. FIGS. 5 and 6 illustrate that. Thus, it is seen in FIGS. 5 and 6 that an entryway to the grooves 150, 152 is provided which is defined in part by locking lips 160, 162 formed with the head or with the head and block. The locking lips define an entryway which is substantially less in vertical dimension than the distance between the confronting surfaces of the groove. The sealing effects of the grooves 150, 152 with their armors 100, 120, respectively, and their functional cooperation with the associated gasket is otherwise the same as just described with respect to the embodiments of FIGS. 1–4.

Figure 7:
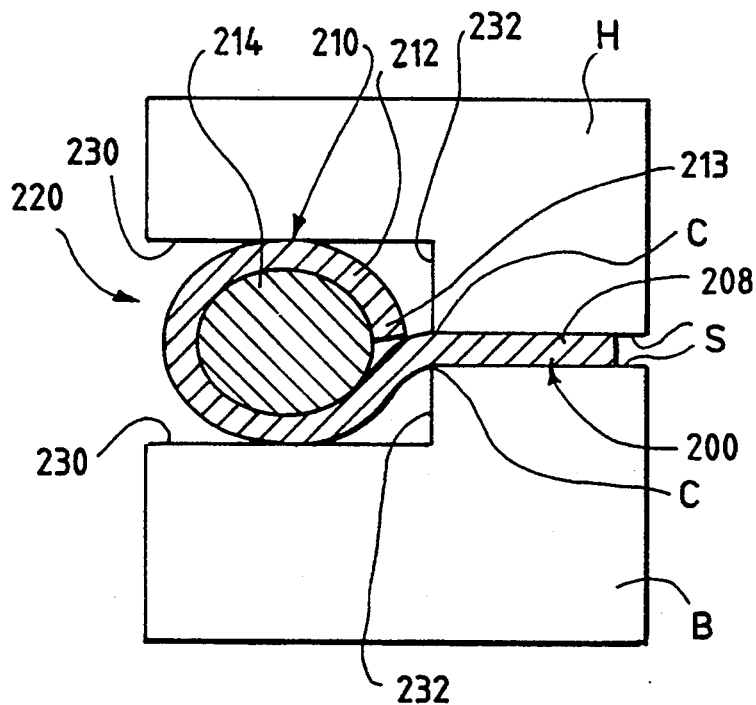
FIG. 7 is a cross-sectional view, like that of FIG. 3, of an improved gasket of my present invention.

Referring now to the invention of FIG. 7, a gasket 200 comprises a main body 208 and a fire ring 210 at each combustion opening. Gasket 200 may be configured generally as shown in FIG. 2, except that the engine with which it is used is a dry deck engine. It may also be used with an air-cooled engine. That being so, there are no coolant passages in the main body of the gasket, although oil passages may remain. Fire ring 210 includes an armor 212 and a wire ring 214. Wire 214 may be of low carbon steel. The armor and main body, which are integrally formed, are of stainless steel. The armor 212 is generally of a circular cross-section having a closed first end and a closed down second end, and receives and ensheathes the wire ring 214. Although the armor may be closed in the offset configuration shown, the rolled end 213 may be moved forward (as seen from FIG. 7) to overlie the horizontal surface of the main body 208 immediately adjacent the downturned connected portion of the armor.

As may be seen and appreciated, the wire ring 214 has a thickness or diameter which is substantially greater than the thickness of the main body 208.

As shown by FIG. 7, a perimetric groove 220 surrounding each cylinder may be machined into the clamping surfaces S of the head H and block B adjacent and generally concentric with the zone of intersection of the main body 208 and armor 212. The groove may be variously configured, but it defines a recess in the head having surfaces which may be referred to as generally horizontal land areas 230 and generally vertical walls 232 extending between land areas 230 and the confronting clamping surface S. The walls 232 and clamping surfaces S intersect in corners C which may be generally square or which may be slightly chamfered. The height of the groove 220 is such that when the engine is closed and the gasket is properly positioned, the wire ring 214 will be significantly compressed. In the embodiment of FIG. 7, the main body and armor may be about 0.01 inch stainless steel, such as 321 stainless steel, and the wire, prior to installation, may be a 0.046 inch diameter low carbon steel ring.

From FIGS. 2 and 7 it will be apparent that when the gasket 200 is positioned on the block relative to the head and is torqued down between clamping surfaces S of the head and block via bolts (not shown), that the gasket 200 is securely clamped into sealing engagement with the head and block and the wire ring is compressed. The gasket and armor produce a combustion seal which has a primary seal against the land areas 230 and a secondary seal against the corner C, as well as a tertiary seal against the head and block in the zone of at which the main body adjacent the armor is clamped against the main body. The plural seals also produce a labyrinth effect, with any escaping gas being under reduced pressure at the secondary and tertiary seals making sealing of those zones somewhat easier.

The sealing arrangement of FIG. 7 resists pull-in, the tendency of wire to be pulled into the combustion cylinders under high vacuum under extreme conditions. Similarly, physical blow-out of the armors and associated wire rings is avoided by the groove 220 and corners C, and by-pass of gases in extreme operating conditions is avoided via the multiple gas seals. Pull-in may be resisted by using locking lips as described above.

Figure 8:
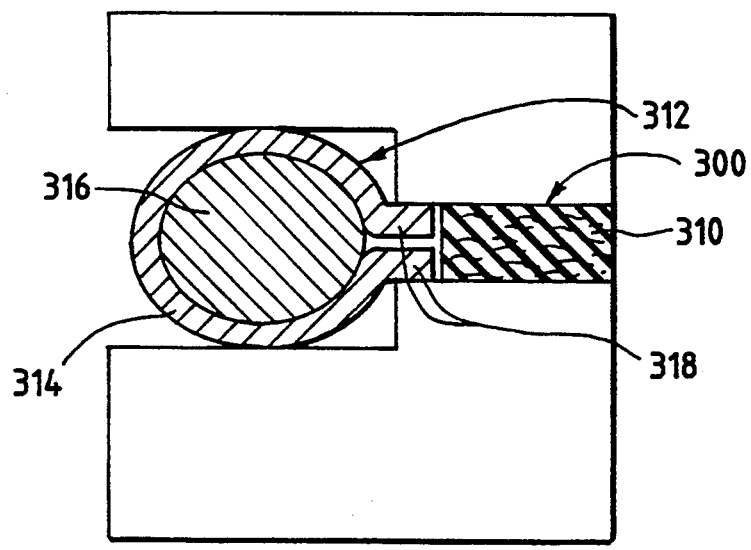
FIG. 8 is a cross-sectional view of a further embodiment of an improved gasket of my present invention.

Although the gasket of FIG. 7 is shown to comprise an integrally formed main Body and armor, it is possible to use a separately formed armor and wire ring inserted in an opening in the main body. Such a configuration is illustrated in FIG. 8, where the head, block and groove are essentially the same as in FIG. 7, and the gasket 300 is seen to comprise a main body 310 and a fire ring 312. Fire ring 312 comprises an armor 314 and an ensheathed wire ring 316. Legs 318 are used to secure the fire ring in the main body, as in a press fit. The wire may be low carbon steel, and the armor and body may be stainless steel. Typical materials of the parts comprise a 0.054 low carbon steel wire 316, a 0.008 inch armor 314 of 321 stainless steel, and a 0.020 inch gasket body 310 of 304 stainless steel.

It will be appreciated that the primary and tertiary seals are effected by the torquing of the engine to a sealed condition via the bolts. When the engine is running, at idle, the cylinder pressure acts to push the armor outwardly, hence more strongly against the corners C of the grooves. The greater the pressure, considering also the torquing load, the steeper the angle at which the resultant reactive load at the corner acts against the armor. Typically under load conditions beyond idle conditions, the reactive resultant effectively intersects the wire ring, thereby producing a high effective secondary sealing effect at the corners C.

From the foregoing it will be apparent to those skilled in the art that further modifications may be made and provided without departing from the spirit of the invention. Accordingly, the scope of the invention is to be considered as limited only to the extent made necessary by the appended claims.

What is claimed is:

1. A method of sealing a high performance internal combustion engine having a head and a block and a plurality of cylinders, each of said head and block having a main clamping surface, and an associated head gasket between said main clamping surfaces, the method comprising:

providing a gasket having a plurality of combustion openings and comprising a main body and a fire ring for each combustion opening, each said fire ring comprising a wire ring and an armor ensheathing said wire ring, said wire ring being oversized and having a thickness greater than the thickness of said main body;

providing a groove opening into and surrounding each cylinder, said groove being provided in one or both of said head and said block generally concentric with each said combustion opening, each said groove having a land area and a generally vertical wall which intersects with the main clamping surface of said head or block; and positioning said gasket on said block relative to said head, so that when said head is torqued down, each said groove receives said fire ring to compress said wire ring to provide a primary seal therewith at said land area, the wall engages said armor to form a secondary seal, and said head and block main clamping surfaces clamp against said main body.

2. The method of claim 1, and wherein said main body and armor are integrally formed.

3. The method of claim 1 and wherein said wall and said head or block main clamping surfaces define an annular corner at the edge of the groove which, under load, bears against an adjacent armor and acts with a resultant force which intersects the wire ring to provide a highly effective secondary seal for said engine.

4. The method of claim 1 and wherein vertically aligned groove portions are provided in each of said head and block, each of which receives said fire ring when the head is torqued down.

5. An automotive engine and head gasket assembly comprising a head, a block defining cylinders, and a head gasket, said head and block together defining a pair of confronting clamping surfaces and a perimetric groove opening into and surrounding each cylinder and disposed between said pair of surfaces, said groove having a pair of confronting spaced surfaces having a first vertical dimension between them, said head gasket defines a plurality of combustion openings and comprises a main body of a first thickness and a fire ring disposed and secured in each combustion opening, each said fire ring comprising an armor and a wire ring, said armor ensheathing a wire ring for providing a combustion seal, said armor having a second vertical dimension greater than said first vertical dimension prior to assembly and which is substantially greater than the vertical dimension of said main body, whereby, in use, the combustion seal provides a labyrinth seal against the spaced surfaces of the groove and against a corner defined by the groove.

6. An automotive gasket and head gasket assembly in accordance with claim 5 wherein said groove is defined in part by each of said head and block.

7. An automotive engine and head gasket assembly in accordance with claim 5 and wherein said main body and armor are integrally formed.

8. An automotive engine and head gasket assembly in accordance with claim 5 and wherein said groove defines an entryway from said cylinder thereto which is substantially less in vertical dimension than said first vertical dimension, thereby to prevent movement of said combustion seal therethrough.

9. An automotive engine and head gasket assembly in accordance with claim 8 and wherein said entryway is defined in part by a locking lip formed with at least one of said head and block.

* * * * *